US007835956B2

(12) United States Patent
Aber et al.

(10) Patent No.: US 7,835,956 B2
(45) Date of Patent: *Nov. 16, 2010

(54) SYSTEM AND METHOD FOR INVOICE IMAGING THROUGH NEGATIVE CONFIRMATION PROCESS

(75) Inventors: Thomas Alexander Aber, Endicott, NY (US); Patricia Ann Chauncey, Endicott, NY (US); Susan Bumgardner Cirulli, Endicott, NY (US); Glenn Paul Modrak, Conklin, NY (US); William Montgomery Sjostrom, Rome, PA (US); Sherry Lee Wilson, Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 614 days.

This patent is subject to a terminal disclaimer.

(21) Appl. No.: 11/973,936

(22) Filed: Oct. 11, 2007

(65) Prior Publication Data
US 2008/0120212 A1 May 22, 2008

Related U.S. Application Data

(63) Continuation of application No. 09/815,313, filed on Mar. 22, 2001, now Pat. No. 7,283,976.

(51) Int. Cl.
*G07F 19/00* (2006.01)
(52) U.S. Cl. .............................. 705/34; 705/40; 705/28; 705/29
(58) Field of Classification Search ........................ None
See application file for complete search history.

(56) References Cited

U.S. PATENT DOCUMENTS

| 5,168,444 | A | | 12/1992 | Cukor et al. ................... 705/1 |
| 5,963,925 | A | | 10/1999 | Kolling et al. ................ 705/40 |
| 5,970,475 | A | * | 10/1999 | Barnes et al. ................. 705/27 |
| 6,507,826 | B1 | | 1/2003 | Maners ........................ 705/34 |
| 6,826,542 | B1 | | 11/2004 | Virgin et al. .................... 705/34 |
| 7,133,868 | B1 | * | 11/2006 | Ruest et al. ....................... 1/1 |
| 7,197,480 | B1 | * | 3/2007 | Chollon et al. ................ 705/27 |
| 7,356,496 | B2 | * | 4/2008 | Kane et al. .................... 705/30 |
| 2002/0103731 | A1 | * | 8/2002 | Barnard et al. ................ 705/34 |
| 2002/0143699 | A1 | * | 10/2002 | Baumann et al. .............. 705/40 |

FOREIGN PATENT DOCUMENTS

GB 2082814 A 3/1982

OTHER PUBLICATIONS

Baron et al., "Web-based E-catalog systems in B2B procurement", Association for Computering Machinery, May 2000, vol. 43 No. 5, p. 93+.
van Riel et al., "Exploring consumer evaluations of e-services: a portal site", International Journal of Service Industry Management, 2001, vol. 12 No. 3, p. 359+.

* cited by examiner

*Primary Examiner*—F. Zeender
*Assistant Examiner*—Christopher Buchanan
(74) *Attorney, Agent, or Firm*—Schmeiser, Olsen & Watts; William E. Schiesser

(57) ABSTRACT

A system for processing invoices including a front-end requisition and catalog system; a back-end procurement system; a scanner for scanning images of invoices; an image system and store for storing said scanned images and serving them to said workstation keyed to said invoice in connection with positive or negative confirmation processing of the invoice.

14 Claims, 12 Drawing Sheets

Req/Cat Web Confirmations

United Technologies

- Confirmations Home
- Confirmations Help
- Confirmation Notices
- Summary Notices
- Administration
- Invoice Image Search
- Req/Cat Home

Invoice Image Search

[ Search | View All | Previous | Next ]

| Invoice Key | Supplier | Entry Date |
|---|---|---|
| CAONCA3100000000 | BRUCKNER SUPPLY COMPANY INC | 2/8/2000 |
| CAONCA3100000001 | BRUCKNER SUPPLY COMPANY INC | 2/9/2000 |
| CAONCA3100000002 | BRUCKNER SUPPLY COMPANY INC | 2/9/2000 |
| CAONCA3100000003 | BRUCKNER SUPPLY COMPANY INC | 2/9/2000 |
| CAONCA3100000004 | BRUCKNER SUPPLY COMPANY INC | 2/9/2000 |
| CAONCA3100000007 | BRUCKNER SUPPLY COMPANY INC | 2/9/2000 |
| CAONCA3100000010 | BRUCKNER SUPPLY COMPANY INC | 2/9/2000 |
| CAONCA3100000014 | BETZDARBORN | 2/14/2000 |
| CAONCA3100000015 | PURE WATER SOLUTIONS | 2/14/2000 |

FIG. 9

Req/Cat Web Confirmations

| Search | View All | Previous | Next |

Supplier      Entry Date
CAONCA3100000002 BRUCKNER SUPPLY COMPANY INC    2/9/2000

- United Technologies
- Confirmations Home
- Confirmations Help
- Confirmation Notices
- Summary Notices
- Administration
- Invoice Image Search
- Invoice Image Search
- Req/Cat Home

Invoice Image Search

Invoice Key
CAONCA3100000002

Netscape

Enter one or more values below to search for invoices.
Fields marked with * are required.
Enter multiple companies separated by commas: ABDC,EFGH,IJKL Country: [CA]
Company*: [ONCA]
Department: [ ]
Vendor Number: [ ]
Invoice: [3100000002]
Purchase Order Number: [ ]
Vendor Invoice: [ ]
Start Date (mm-dd-yyyy): [ ]-[ ]-[ ]
End Date (mm-dd-yyyy): [ ]-[ ]-[ ]

[Cancel] [Search]

FIG. 10

SYSTEM AND METHOD FOR INVOICE IMAGING THROUGH NEGATIVE CONFIRMATION PROCESS

CROSS REFERENCES TO RELATED APPLICATIONS

This application is a continuation of U.S. patent application Ser. No. 09/815,313 filed 22, Mar. 2001 now U.S. Pat. No. 7,283,976 by Thomas A. Aber, Patricia A. Chauncey, Susan B. Cirulli, Glenn P. Modrack, William J. Sjostrom, and Sherry L. Wilson for System and Method for Invoice Imaging Through Negative Confirmation Process.

BACKGROUND OF THE INVENTION

The following U.S. patent applications, filed concurrently or otherwise copending, are assigned to the assignee hereof and contain subject matter related, in certain respect, to the subject matter of the present application.

Ser. No. 09/657,215, filed 7 Sep. 2000, entitled "System and Method for Clustering Servers for Performance and Load Balancing";

Ser. No. 09/657,216, filed 7 Sep. 2000, entitled "System and Method for Front End Business Logic and Validation";

Ser. No. 09/657,217, filed 7 Sep. 2000, entitled "System and Method for Data Transfer With Respect to External Applications";

Ser. No. 09/656,037, filed 7 Sep. 2000, entitled "System and Method for Providing a Relational Database Backend";

Ser. No. 09/656,803, filed 7 Sep. 2000, entitled "System and Method for Providing a Role Table GUI via Company Group";

Ser. No. 09/656,967, filed 7 Sep. 2000, entitled "System and Method for Populating HTML Forms Using Relational Database Agents";

Ser. No. 09/657,196, filed 7 Sep. 2000, entitled "System and Method for Catalog Administration Using Supplier Provided Flat Files";

Ser. No. 09/657,195, filed 7 Sep. 2000, entitled "System and Method for Providing an Application Navigator Client Menu Side Bar";

Ser. No. 09/815,318, filed 22 Mar. 2001, entitled "SYSTEM AND METHOD FOR GENERATING A COMPANY GROUP USER PROFILE";

Ser. No. 09/815,317, filed 22 Mar. 2001, entitled "SYSTEM AND METHOD FOR SYNCHRONIZING LEDGER ACCOUNTS BY COMPANY GROUP";

Ser. No. 09/815,320, filed 22 Mar. 2001, entitled "SYSTEM AND METHOD FOR GROUPING COMPANIES ACCORDING TO ACCOUNTING SYSTEM OR RULES";

Ser. No. 09/815,316, filed 22 Mar. 2001, entitled "SYSTEM AND METHOD FOR FRAME STORAGE OF EXECUTABLE CODE";

Ser. No. 09/815,312, filed 22 Mar. 2001, entitled "SYSTEM AND METHOD FOR LEVERAGING PROCUREMENT ACROSS COMPANIES AND COMPANY GROUPS"; and Ser. No. 09/798,598, filed 2 Mar. 2001, entitled "SYSTEM AND METHOD FOR MANAGING INTERNET TRADING NETWORKS".

The above-identified patent applications are incorporated herein by reference.

TECHNICAL FIELD OF THE INVENTION

This invention pertains to invoice processing. More particularly, it relates to a system and method for capturing and rendering invoices viewable on the web.

BACKGROUND ART

Historically, payments of invoices are triggered by a three way match: the invoice must match the purchase order (PO) terms and conditions, and the goods received must match those stated in quality and quantity against that PO. A problem occurs, particularly with respect to general procurement items, when such items are not tangible things which come through a receiving dock. In this case, it is difficult to do the three way match. For example, services may not flow through a dock. As a result, procurement systems have defined an "invoice not received" situation, which results in payment not being made until someone does something—and that initiates what is referred to as a paper chase.

Some procurement systems implement a "negative confirmation" process which results in payment of an invoice unless a requester submits a rejection. In this process, when an invoice is received, a notification is given to the requester alerting him to fact that the invoice will be paid unless requester sends back a notification that it should not be paid.

Invoices may be received via mail (paper invoices) or electronically (EDI, as IDOC invoices). In a negative confirmation system, it is important that invoice data be provided to a customer requester, and this has, in the case of paper invoices, resulted in the need to transfer paper copies, and in the case of electronic invoices, paper printouts or electronic summaries. In the case of paper copies, this involves the handling of large amounts of paper with the possibility of loss or delay adversely impacting the negative confirmation process, and in the case of electronic summaries providing information which may not be complete and sufficiently clear for quick human processing.

Another problem with negative authorization is that, while it may work fine for low cost things, for larger (more expensive) things, the risk that payment will be made before negative confirmation could be received may be too great.

It is an object of the invention to provide an improved system and method for processing invoices.

It is a further object of the invention to provide a system and method for processing invoices according to either a positive or negative approval process.

It is a further object of the invention to provide a system and method for processing both electronic and paper invoices by either a positive or negative approval process and with electronic capture and storage of all invoices for viewing by a customer approver.

SUMMARY OF THE INVENTION

A system and method for processing invoices, the method including the preparing of an invoice image; storing the invoice image in an image store; keying said image to invoice data; communicating invoice confirmation request to an approver, the request including invoice data and a link to the invoice image; and responsive to approver selection of the link, displaying the invoice image.

In accordance with an aspect of the invention, there is provided a computer program product configured to be operable for processing invoices.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 8-12 represent a series of screen captures illustrating the user interface for requester processing of invoice confirmations.

BEST MODE FOR CARRYING OUT THE INVENTION

Figure 1:
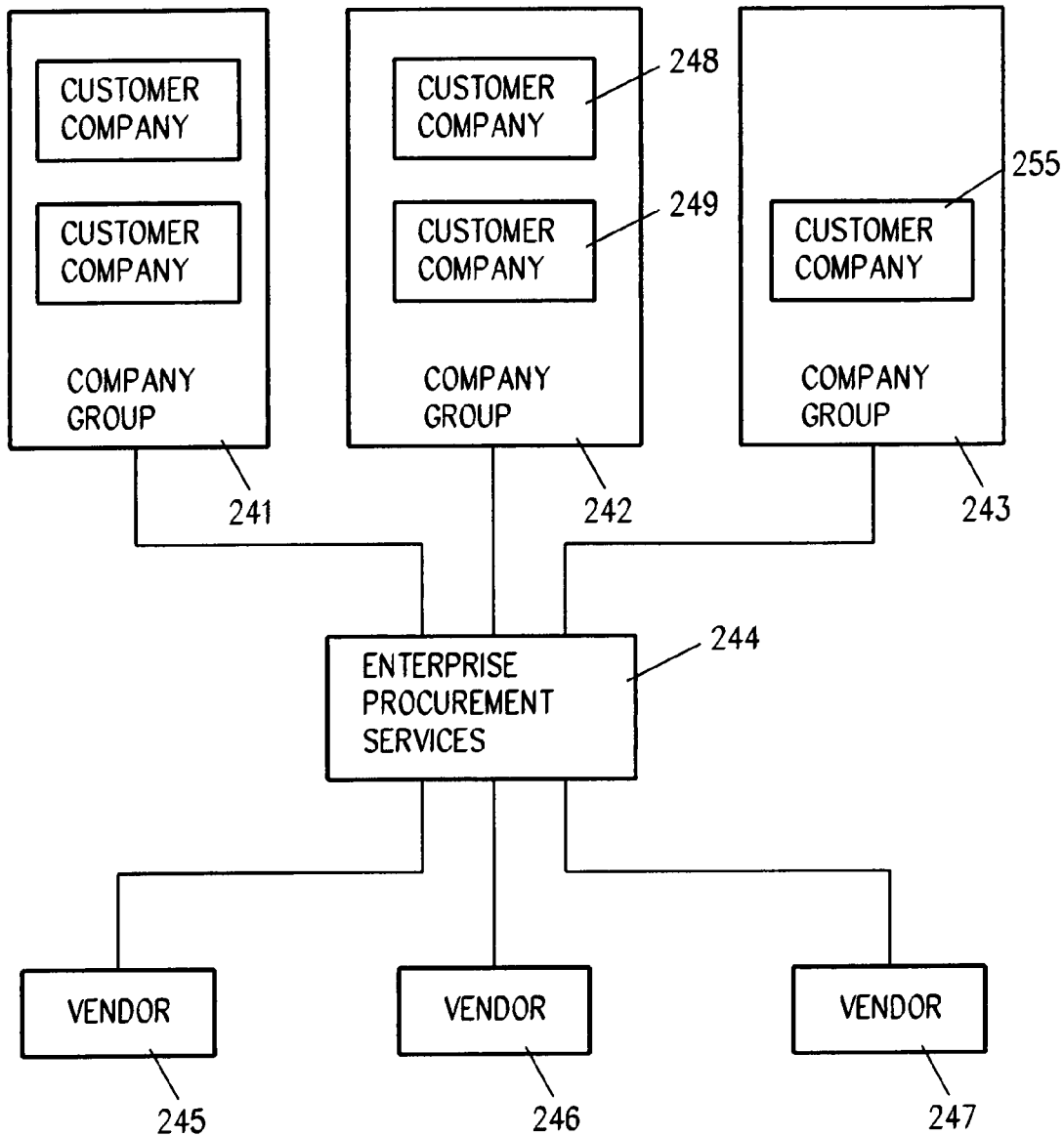
FIG. 1 is a high level system diagram illustrating an enterprise system for providing procurement services with respect to a plurality of vendors on behalf of a plurality of company groups of related customer companies in accordance with the preferred embodiment of the invention.

Referring to FIG. 1, the procurement services organization of an enterprise 244 provides procurement services to a plurality of companies 248, 249 organized in a plurality of company groups 241-243 with respect to a plurality of vendors 245-247.

Figure 2:
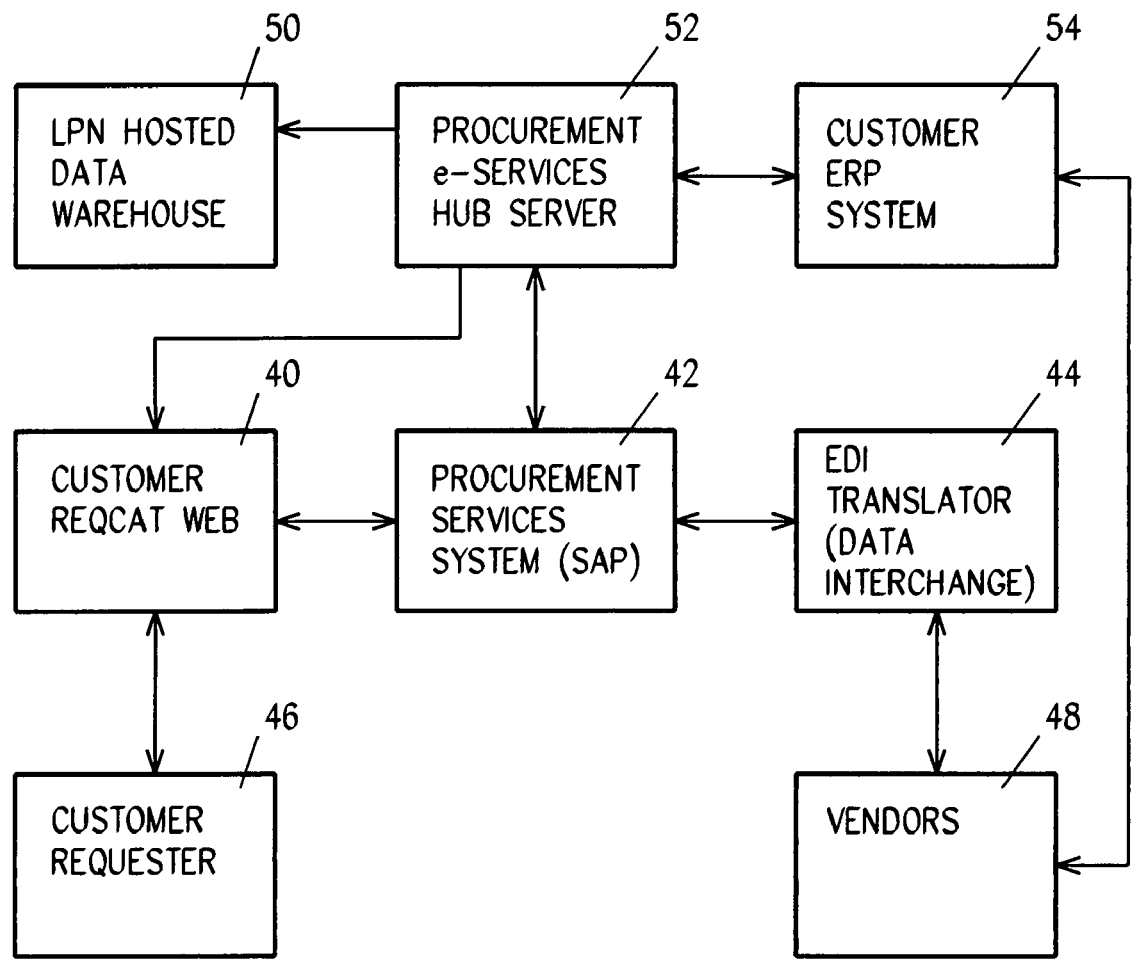
FIG. 2 is a high level system diagram illustrating the LPN application architecture of the preferred embodiment of the invention.

Referring to FIG. 2, the architecture of system components administered by enterprise 244 includes a customer requisition and catalog (ReqCatWeb, or RCW) system 40, an enterprise procurement system (SAP) 42, an enterprise data interchange, or EDI translator system 44, an enterprise (LPN) hosted data warehouse 50, an enterprise procurement hub server 52. Also illustrated in FIG. 2 are a customer requester web terminal 46 and vendors 48.

ReqCatWeb 40 is a front-end interface between the user and the procurement system, providing access to catalogs and commodities, to order the day-to-day items required for the business.

SAP 42 is the back-end purchasing engine of the enterprise, such as is supported by IBM, accepting the requisitions from the front-end ReqCatWeb 40, and generating EDI transactions, as well as the accounting transactions for the requisitions, etc.

EDI (Electronic Data Interchange) 44 is an application that interacts with suppliers by sending standardized transactions for purchase orders, receiving invoices, etc.

LPN Hosted DataWarehouse 50 is a data-warehouse facility for storing all transactions that occur in the system; used as a tool for monitoring transactions and gathering statistics.

Hub Server 52 is a back-end processing server for transferring data between elements (that is, servers) of the system.

Customer ERP System 54 is a back-end purchasing system as supported by the customer.

Figure 3:
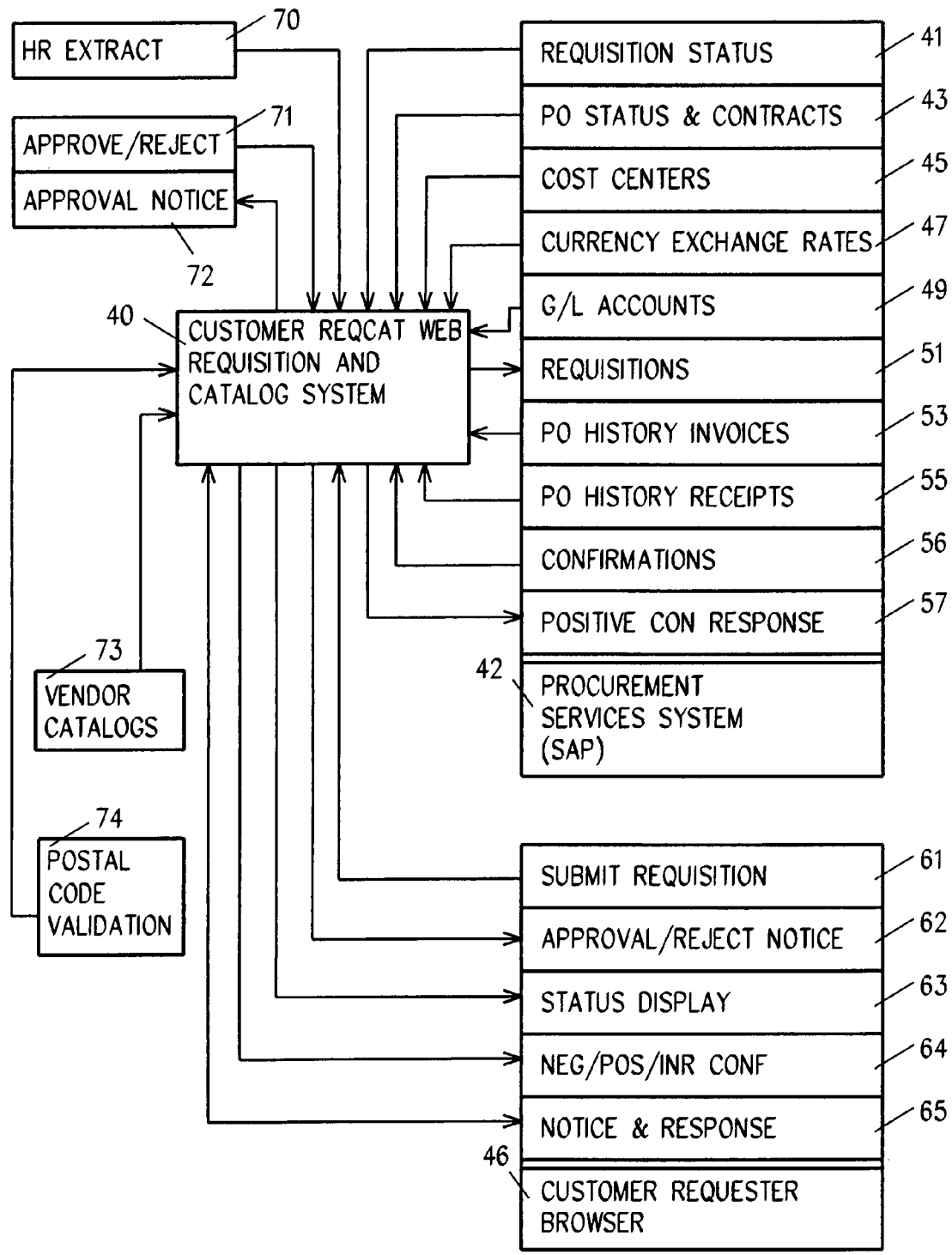
FIG. 3 is a diagram illustrating the inputs and outputs of the customer requisition catalog (RCW) component of the architecture of FIG. 2.

Referring to FIG. 3, the inputs to customer RCW system 40 from procurement system 42 include requisition status 41, purchase order (PO) status and contracts 43, cost centers 45, currency exchange rates 47, general ledger (G/L) accounts 49, PO history invoices 53, PO history receipts 55, and confirmations 56. The outputs from customer RCS system 40 to procurement system 42 include requisitions 51 and positive confirmation responses 57.

The inputs to customer RCW system 40 from a customer requester browser 46 include submit requisition, and outputs from system 40 to browser 46 include approval/rejection notice 62, status display 63, and negative/positive/INR confirmation. Notice and response data 65 is exchanged between RCW system 40 and browser 46.

Other inputs to RCW system 40 include vendor catalogs 73 from vendors 245-247 via enterprise EDI translator 44, postal code validation data 74 from an enterprise RCW system (not shown), and human resource extract data 70 from enterprise hub server 52. RCW system 40 also provides approval notices 72 and receives approve/reject data 71. Approval Notices go to the departmental approvers for the person creating the requisition. These can be the requester's managers (first-line, second-line, etc), as well as chemical approvers, commodity approvers, financial approvers, etc.

Figure 4:
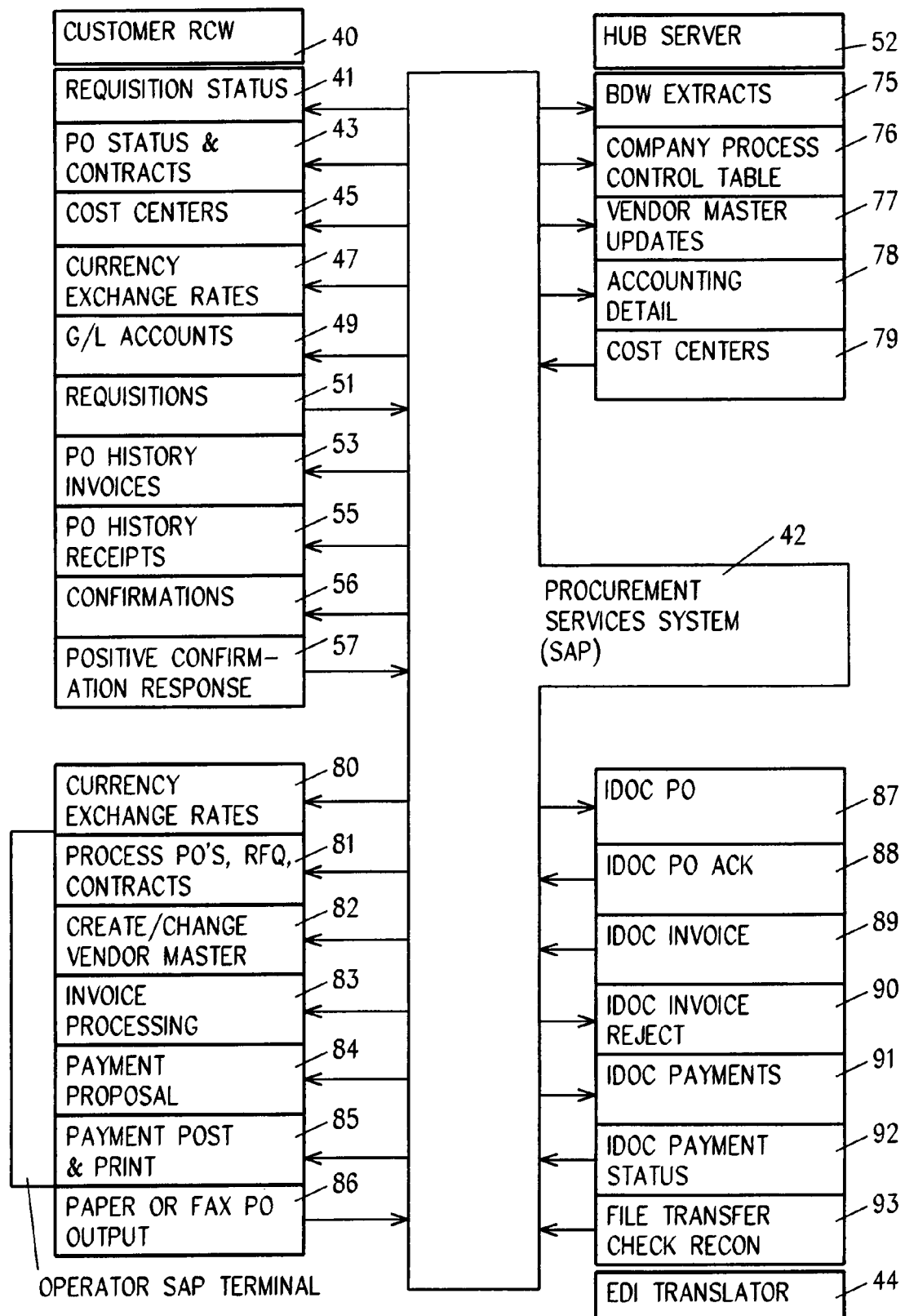
FIG. 4 is a diagram illustrating, inter alia, the inputs and outputs of the enterprise EDI translator 44 of the architecture of FIG. 2.

Referring to FIG. 4, enterprise procurement system 42 receives as inputs from customer RCW system 40 requisitions 51 and positive confirmation responses 57, and provides to customer RCW system 40 requisition status data, purchase order status and contracts data 43, cost center data 45, currency exchange rates 47, G/L accounts 49, PO history invoices 53, PO history receipts 55, and confirmations 56.

Inputs to procurement system 42 from hub server 52 include cost center data 79, and outputs to hub server 52 include BDW extracts, company process control table 76, vendor master updates 77, and accounting detail 78.

Inputs to procurement system 42 from enterprise EDI translator 44 include IDOC PO acknowledgment 88, IDOC invoices 89, IDOC payment status 92 and file transfer check reconstruction 93. Outputs to EDI translator include IDOC PO 87, IDOC invoice rejection 90 and IDOC payments 91.

Inputs to enterprise procurement system 42 from SAP operator terminals include process PO's, RFQ, and contracts data 81, create/change vendor master data 82, invoice processing 83 (which is one input to a general procurement invoicing function within procurement services system 42), payment proposal data 84, and payment post and print 85. Also input to procurement system 42 is currency exchange rate data 80 from an external financial services server (not shown) via an enterprise currency exchange rates server (not shown), and output from procurement system 42 to vendors 48 are paper or fax PO documents 86.

Figure 5:
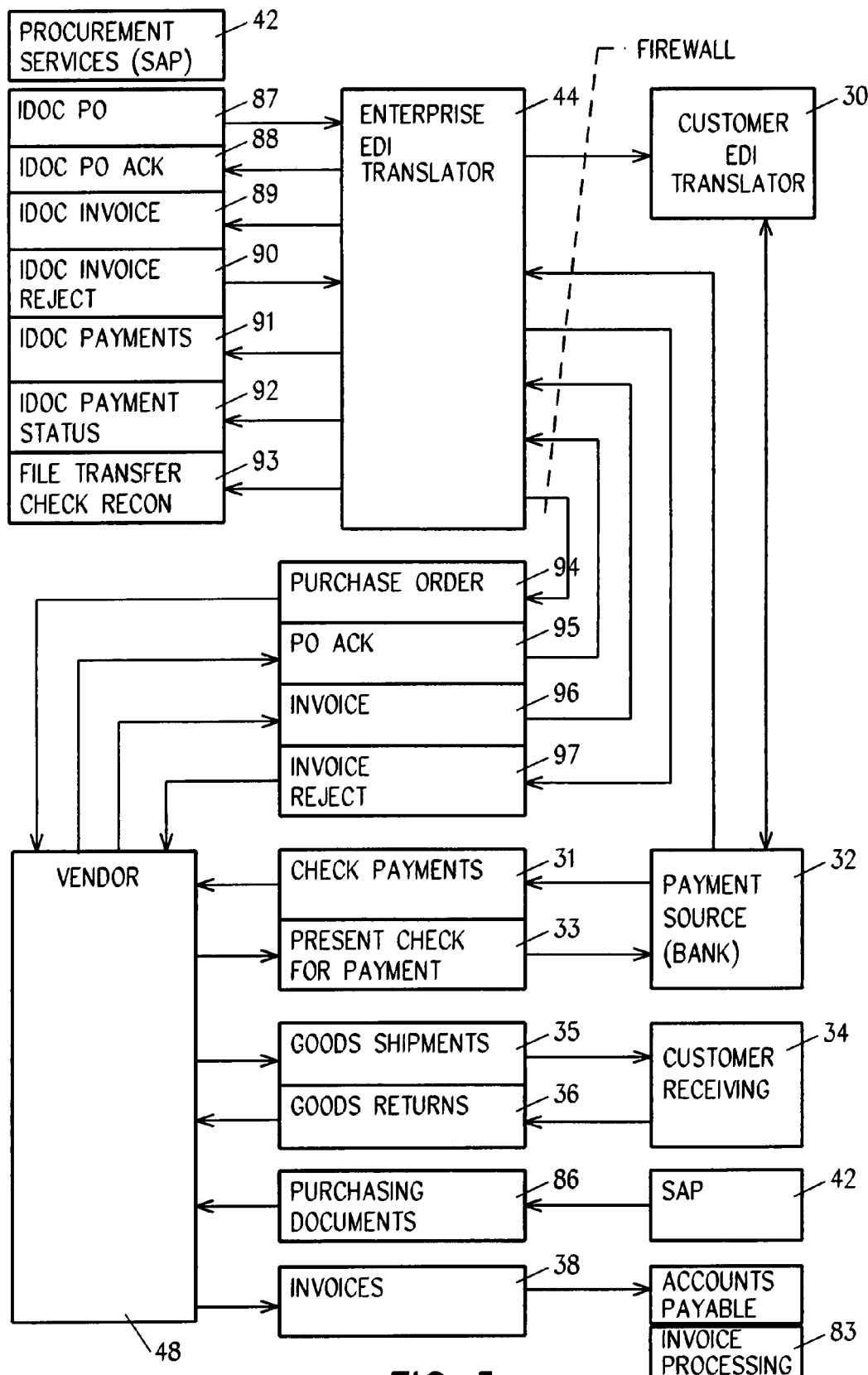
FIG. 5 is a diagram illustrating the inputs and outputs of the enterprise procurement system 42 of the architecture of FIG. 2.

Referring to FIG. 5, inputs to enterprise EDI translator 44 from procurement system 42 include IDOC PO 87 and IDOC invoice reject 90, and outputs to SAP system 42 include IDOC PO acknowledge 88, IDOC invoice 89, IDOC payments 91, IDOC payment status 92 and file transfer check reconstruction 93.

Inputs to enterprise EDI translator 44 from vendor 48 include PO acknowledge 95 and invoice 96, and outputs to vendor 48 include electronic purchase order 94 (as distinguished from paper or fax POs 86) and invoice reject 97. EDI translator also receives payments 32 from source 32 and provides payments to customer EDI translator 30. Bank 32 provides cashed checks and payment status to EDI translator 44. Vendor 48 provides goods shipments 35 to customer receiving 34, and receives back goods returns 36. Vendor 48 receives paper or fax purchasing documents 37 from SAP 42, and provides paper invoices 38 (as distinguished from electronic invoices 96) to enterprise accounts payable for invoice processing 83 at SAP 42.

In accordance with the preferred embodiment of the invention, there is a difference between the hub server 52 and the customer ReqCatWeb 40. Hub server 52 is where the confirmation notices are generated (negcons, poscons, item not received (inr)) and sent via e-mail to the requesters, or initiators, and the summary reports to the managers. The negative confirmation rejections are not handled by any of these systems, but by a note to a designated recipient, defined in a configuration file (Notes Document), and done entirely via e-mail. Positive confirmations are handled at the user-interface level by ReqCatWeb 40, but the recording of the accept or reject of the positive confirmation is handled in hub server 52, as both ReqCatWeb 40 and hub server 52 share access to the database system where all the confirmation data for a given purchase is stored.

Figure 6:
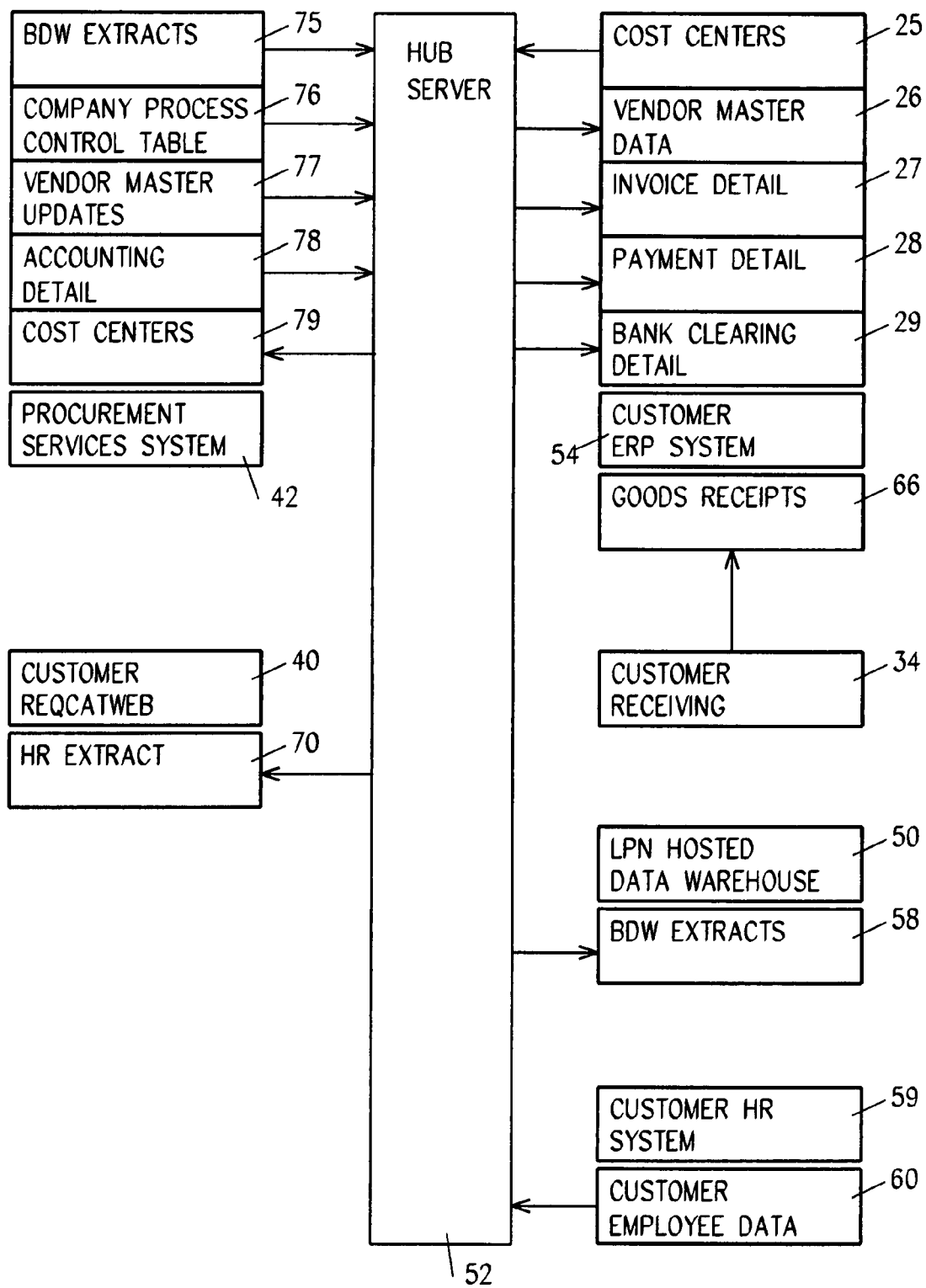
FIG. 6 is a diagram illustrating the inputs and outputs of the enterprise procurement hub server of the architecture of FIG. 2.

Referring to FIG. 6, enterprise procurement services hub server 52 receives as inputs from procurement system 42 BDW extracts 75, company process control table 76, vendor master updates 77 and accounting detail 78, and provides cost centers data 79 (which it receives from customer ERP system 54.) Hub server 52 provides human resource extract data 70, extracted from customer employee data 60, to customer RCW system 40.

Hub server 52 provides to customer ERP system 54 vendor master data 26, invoice detail 27, payment detail 28 and blank clearing detail data 29, and receives cost centers data 25. Customer ERP system 54 also receives goods receipts 66 from customer receiving 34.

Hub server 52 provides BDW extracts 58 to data warehouse 50.

The operation and inter relationships of elements of the architecture of FIGS. 2-6 pertinent to the present invention will be described hereafter in connection with preferred and exemplary embodiments of the systems and methods of the invention.

Figure 7:
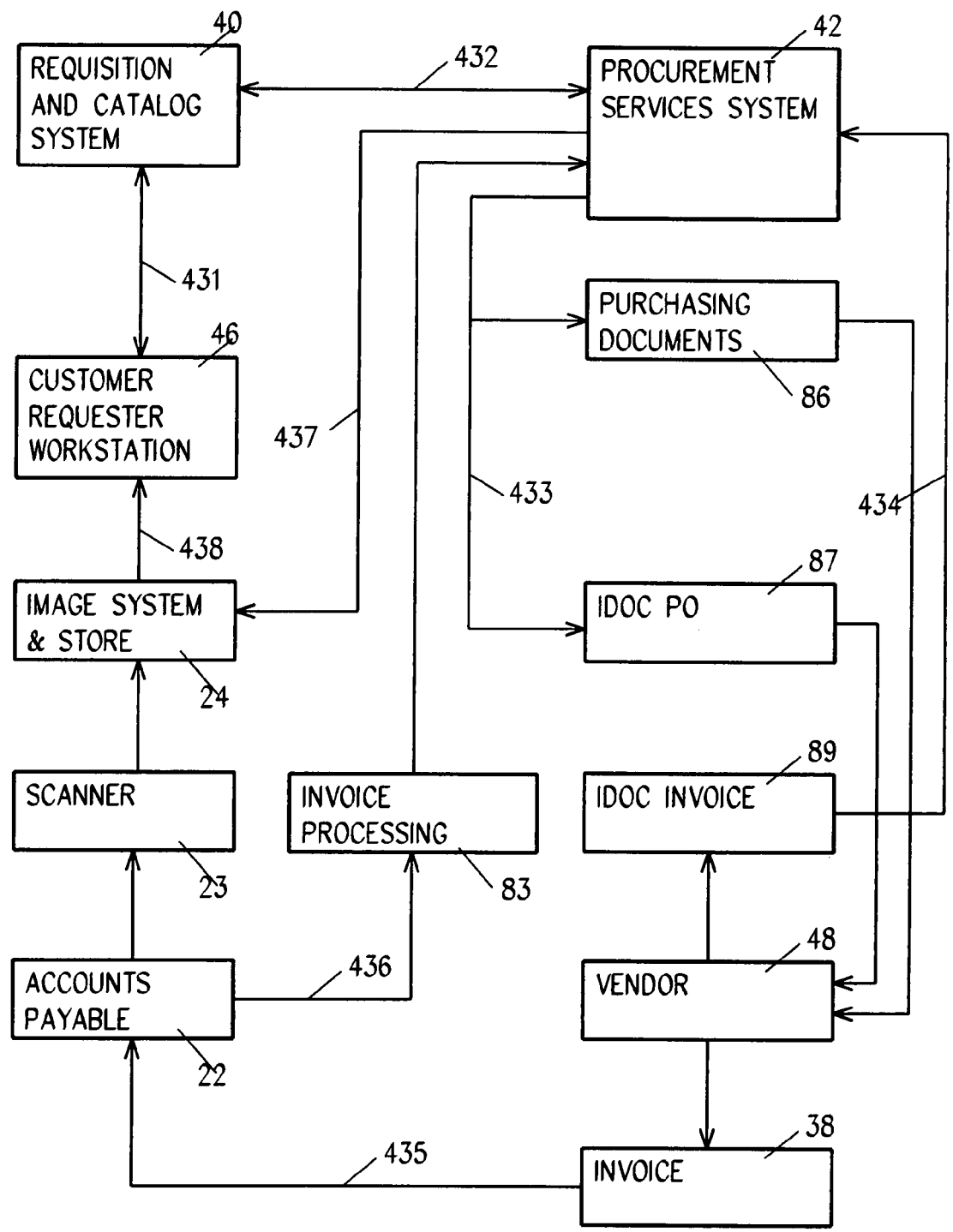
FIG. 7 is a diagram illustrating the system and method of the invention for capturing and rendering invoices viewable on the web in accordance with the preferred embodiment of the invention.

Referring to FIG. 7, in accordance with the preferred embodiment of the invention, a customer requester workstation is connected via a user interface 431 to a front-end requisition and catalog system (Req/Cat Web, or RCW) 40. RCW 40 is connected via interface 432 with procurement services system (SAP) 42. SAP 42 is in electronic or physical communication with vendor 48. An image system and store 24 is connected to scanner 23, via interface 437 with SAP system 42, and via interface 438 with workstation 438.

In operation, the system of FIG. 7 supports a process for requisitioning and purchasing commodities and for capturing invoices and storing them for viewing on the web.

A customer requester 46 interfaces RCW 40 to prepare a purchase request, which is passed as a requisition over interface 432 to SAP 42. SAP 42 prepares from the requisition a purchase order which is sent via EDI as IDOC PO 87 or as paper purchasing document 86 to vendor 48. Vendor, or supplier, 48 fills the order and sends back an invoice, either electronically as IDOC invoice 89 to SAP 42, or as paper invoice 38 which is received and processed by accounts payable personnel. As is represented by line 436 and block 83, accounts payable personnel 22 process paper invoice information to SAP 42. SAP 42 posts the invoice back to RCW 40 which will then send an e-mail notice to user 46 that the invoice will be paid either with (positive) or without (negative) confirmation.

As invoices are received in accounts payable 22, the paper documents are sorted and batched, and then scanned by scanner 23 into scanned image file 24. This scanning may be done in connection with invoice processing 83 and, in either event, when processing the invoice to SAP 42, data is provided identifying the invoice image in store 24. When posting the invoice to RCW 40 for confirmation, the data bridged to RCW 40 by SAP 42 includes unique identifiers that are specific to the invoice and are pointers to the invoice image in store 24.

Responsive to invoice and image data received from SAP 42, RCW 40 prepares a confirmation notice which is sent by e-mail to customer 46. This notice includes url strings which, upon selection by requester 46, are executed to present the invoice images of the invoice from store 24 at requester workstation 46.

Requester 46 is also provided a search interface in RCW 40 that allows a requester to enter criteria and have images of invoices that match that criteria be displayed at workstation 46. Similarly, this interface is available to accounts payable workstations 22 for the same purpose.

There is also allowance for financial review personnel to view invoices based on various criteria, including by company or company grouping, or all invoice images.

Invoices 89 received via electronic interchange data (EDI) are, preferably on a batch basis, converted into text and image files that have the look and feel of paper invoices, and are thus user friendly, or easily understood. As is represented by interface 437, these invoice files are also sent to image system and store 24 and linked with corresponding invoice files in SAP 42 and viewable by requester 46 when processing a positive or negative confirmation request.

FIGS. 8-12 represent a series of screen captures illustrating the user interface for requester processing of invoice confirmations.

Figure 8:

In FIG. 8, the requester is presented with a confirmations panel that includes buttons or tabs for selecting, inter alia, a listing of current confirmation notices and a search of invoice images. The buttons at the top allow the user to view all invoice images, search for a particular invoice image and to move forward or back between screens.

Figure 11:
Figure 12:
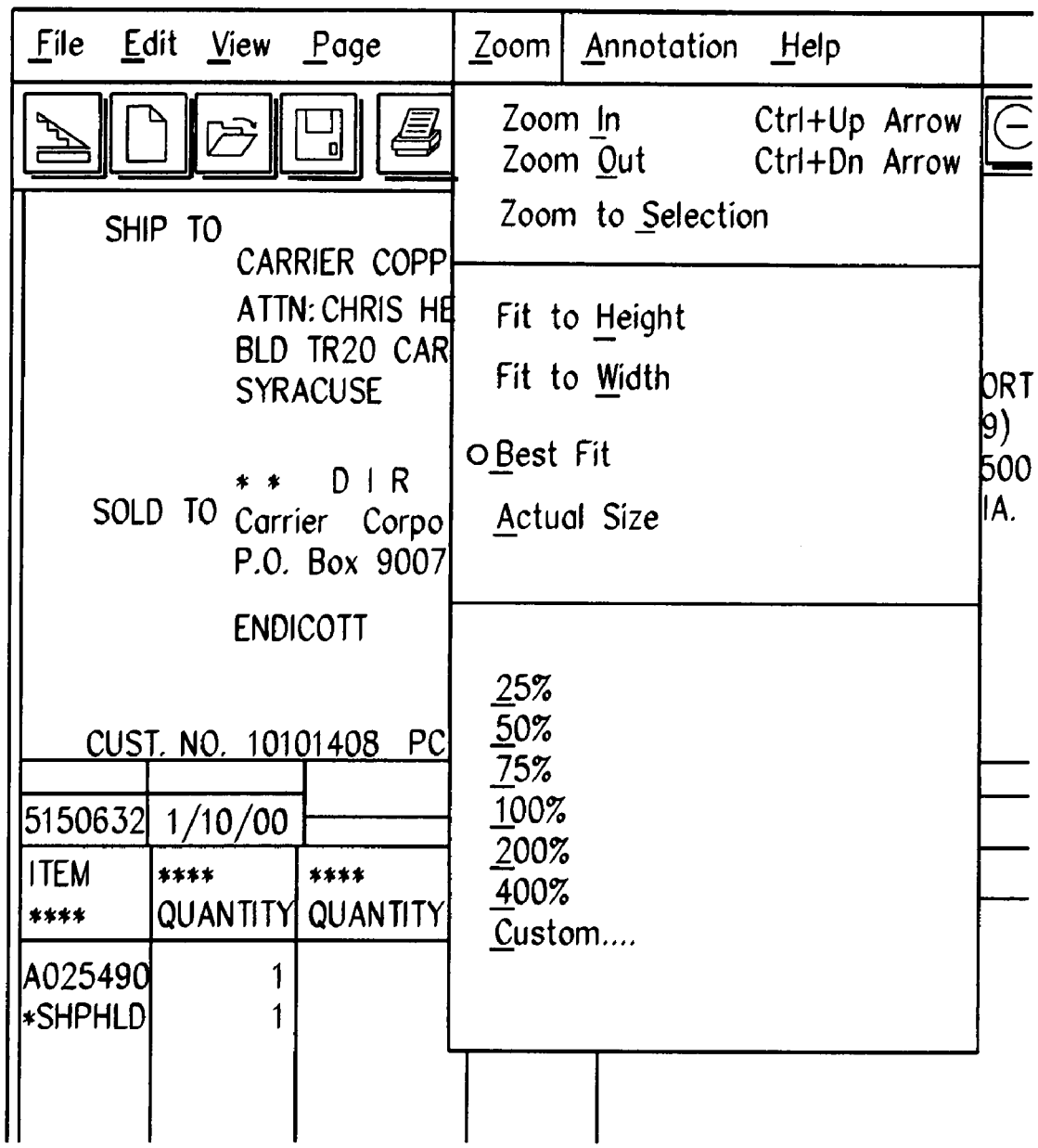

Selecting "View All" from the screen of FIG. 8 results in a display like that of FIG. 9. To search for a particular invoice, the user clicks on the search button and in response is presented a screen in which to enter search arguments. After entering the search arguments and clicking on the search button the user is presented with a screen like that of FIG. 9, an example of a search for country CA, company ONCA, and invoice 310000002. Upon clicking on a particular invoice in the invoice images list of the screen of FIG. 9, the user is presented with a screen, like that of FIG. 10, showing the actual invoice that is associated with the selected invoice key. FIG. 11 illustrates that various zoom and fit functions are afforded to the user to work with the invoice image.

ADVANTAGES OVER THE PRIOR ART

It is an advantage of the invention that there is provided an improved system and method for processing invoices.

It is a further advantage of the invention that there is provided a system and method for processing invoices according to either a positive or negative approval process.

It is a further advantage of the invention that there is provided a system and method for processing both electronic and paper invoices by either a positive or negative approval process and with electronic capture and storage of all invoices for viewing by a customer requester.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Java Script, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for processing invoices by having the individual employee of an enterprise creating an original order for goods and services that a resulting invoice should be paid or not triggered upon a three-way match, said three-way match assuring that the invoice matches purchase order terms and conditions, and the goods and services received match those stated in quality and quantity against said purchase order, said goods and services including goods received through a receiving dock and for which a receipt is generated, and goods and services not received through a dock and for which a receipt is not generated, with invoices for selected goods and services identified as pertaining to items requiring positive confirmation, comprising the steps of:

receiving from said individual employee a requisition for goods or services from a vendor;

preparing from said requisition a purchase order and identifying said goods or services as items requiring one of positive and negative confirmation;

submitting said purchase order to said vendor;

receiving from a first vendor an invoice for said goods or services as an electronic invoice;

receiving from a second vendor an invoice for goods or services as a paper invoice;

communicating by electronic mail a plurality of confirmation requests to said individual employee creating original orders for goods or services, each said request specifying that each said invoice pertains to an item that is subject selectively to negative confirmation and positive confirmation processing; and a negative confirmation processing for a first confirmation request including advising said individual employee via e-mail that said invoice is confirmed unless specifically not approved by said individual employee, and a positive confirmation processing for a second confirmation request including advising said individual employee that said invoice will be confirmed upon entry by said individual employee of approval that invoiced goods and services have been received in quality and quantity matching said purchase order.

2. The method of claim 1, further comprising the step of:

preparing an invoice image of an invoice received for said goods or services ordered by said individual employee;

storing said invoice image in an image store;

keying said image to invoice data;

preparing said invoice images by scanning paper invoices received from a vendor;

each said request instructing said individual employee to log on to said enterprise accounting and catalog system, including said invoice data and a link to said invoice image.

3. The method of claim 2, further comprising the step of:

preparing other of said invoice images by converting electronic invoices received from a vendor into an image file representation having the look of a paper invoice.

4. The method of claim 1, said invoice confirmation request further advising said individual employee to log on to a front-end requisition and catalog server to view invoices for confirmation.

5. The method of claim 4, further comprising the step responsive to said individual employee logging on to said front-end requisition and catalog server server of displaying a list of invoices awaiting confirmation and responsive to user selection of a selected invoice, presenting images of invoices corresponding to links selected by said individual employee.

6. The method of claim 1, further comprising the steps of presenting to said individual employee, an interface for selecting images of invoices matching a selection criteria.

7. A system for processing invoices by having the individual employee creating an original order for goods or services for end use by said individual determine that a resulting invoice should be paid or not triggered upon a three-way match, said three-way match assuring that the invoice match purchase order terms and conditions, and the goods and services received match those stated in quality and quantity against said purchase order, said goods and services including goods received through a receiving dock and for which a receipt is generated, and goods and services not received through a dock and for which a receipt is not generated, with invoices for selected goods and services identified as pertaining to items requiring positive confirmation, comprising:

a front-end requisition and catalog system;

a back-end procurement services system;

a workstation selectively receiving user entry from said individual employee of a requisition request for goods or services, and receiving confirmation requests;

said confirmation request instructing said individual employee to approve a first invoice by negative and a second invoice by positive confirmation processing, said negative confirmation processing including advising said individual employee that said invoice is confirmed unless specifically not approved by said individual employee, and said positive confirmation processing including advising said individual employee that said invoice will be confirmed upon entry by said individual employee of approval;

said front-end requisition and catalog system selectively receiving said requisition requests from said workstation, forwarding said requisition requests to said back-end procurement services system, identifying said goods or services as items requiring one of positive and negative confirmation, and receiving confirmation requests from said back-end system for forwarding to said workstation; and said back-end system selectively issuing purchase orders against said requisitions to a vendor including at least one invoice as electronic invoice and another invoice as a paper purchase order, receiving and processing invoices electronic invoices directly from said vendor and paper invoices as received and processed by accounts payable personnel and processing confirmation requests to said front-end system for communication to said workstation for approval by said individual employee that invoiced goods and services have been received in quality and quantity matching said purchase order.

8. A program storage device readable by a machine, tangibly embodying a program of instructions executable by a machine to perform a method for processing invoices by having the individual employee creating an original order as an end user of a commodity or service determine that a resulting invoice should be paid or not triggered upon a three-way match, said three-way match assuring that the invoice match purchase order terms and conditions, and the goods and services received match those stated in quality and quantity against said purchase order, said goods and services including goods received through a receiving dock and for which a receipt is generated, and goods and services not received through a dock and for which a receipt is not generated, with invoices for selected goods and services identified as pertaining to items requiring positive confirmation, said method comprising:

receiving a plurality of invoices;

communicating first and second invoice confirmation requests to said individual employee, each said request including said invoice data for respective invoice confirmation requests;

said individual employee processing a first invoice by a negative confirmation process including advising said individual employee via e-mail that said first invoice is confirmed unless specifically not approved by said individual employee, and said individual employee processing a second invoice by a positive confirmation process including advising said individual employee that said invoice will be confirmed upon entry by said individual employee of approval that invoiced goods and services have been received in quality and quantity matching said purchase order.

9. The program storage device of claim 8, said method further comprising:

preparing invoice images by scanning paper invoices received from a vendor.

10. The program storage device of claim 9, said method further comprising:

preparing other of said invoice images by converting electronic invoices received from a vendor into an image file representation having the look of a paper invoice.

11. The program storage device of claim 8, said invoice confirmation request advising said individual employee to process said confirmation as a negative confirmation or a positive confirmation.

12. The program storage device of claim 11, an invoice confirmation request advising said individual employee to log on to a front-end requisition and catalog server to view invoices for confirmation.

13. The program storage device of claim 12, said method further comprising responsive to said individual employee logging on to said front-end server of displaying a list of invoices awaiting confirmation and responsive to selection of a selected invoice by said individual employee, presenting images of invoices corresponding to links selected by said individual employee.

14. The program storage device of claim 8, said method further comprising presenting to said individual employee an interface for selecting images of invoices matching a selection criteria.

\* \* \* \* \*